INVENTORS
JOSEPH A. VOSS
CARL W. JOHNSON

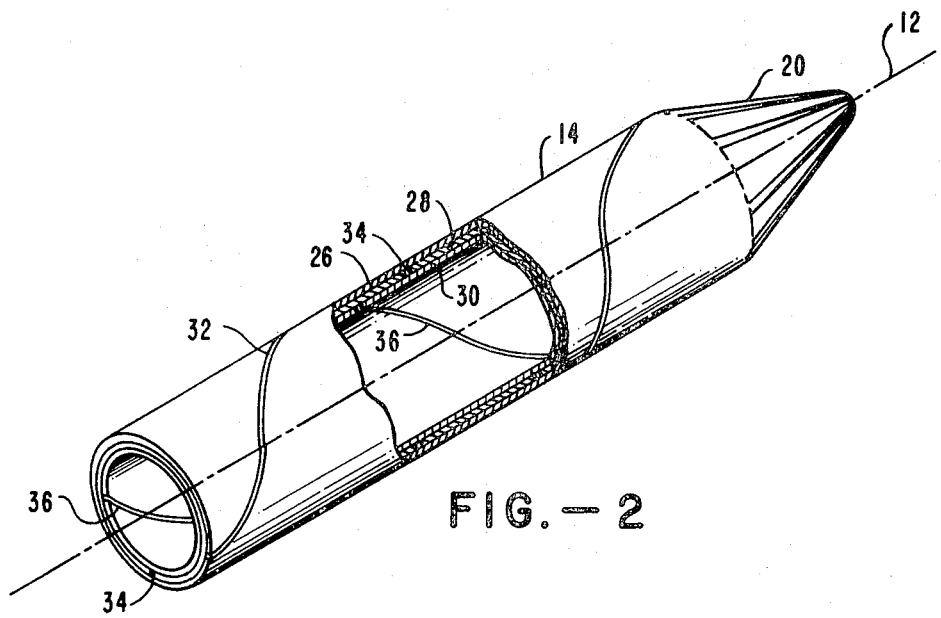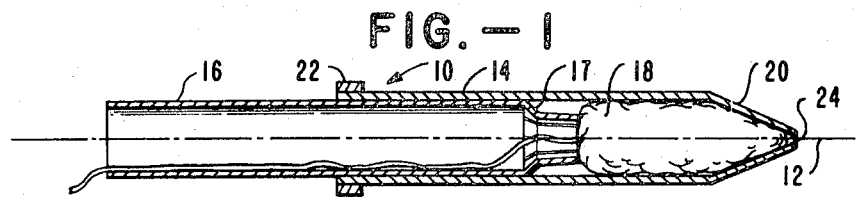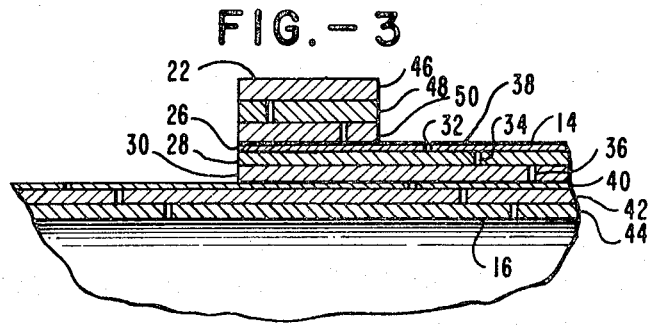

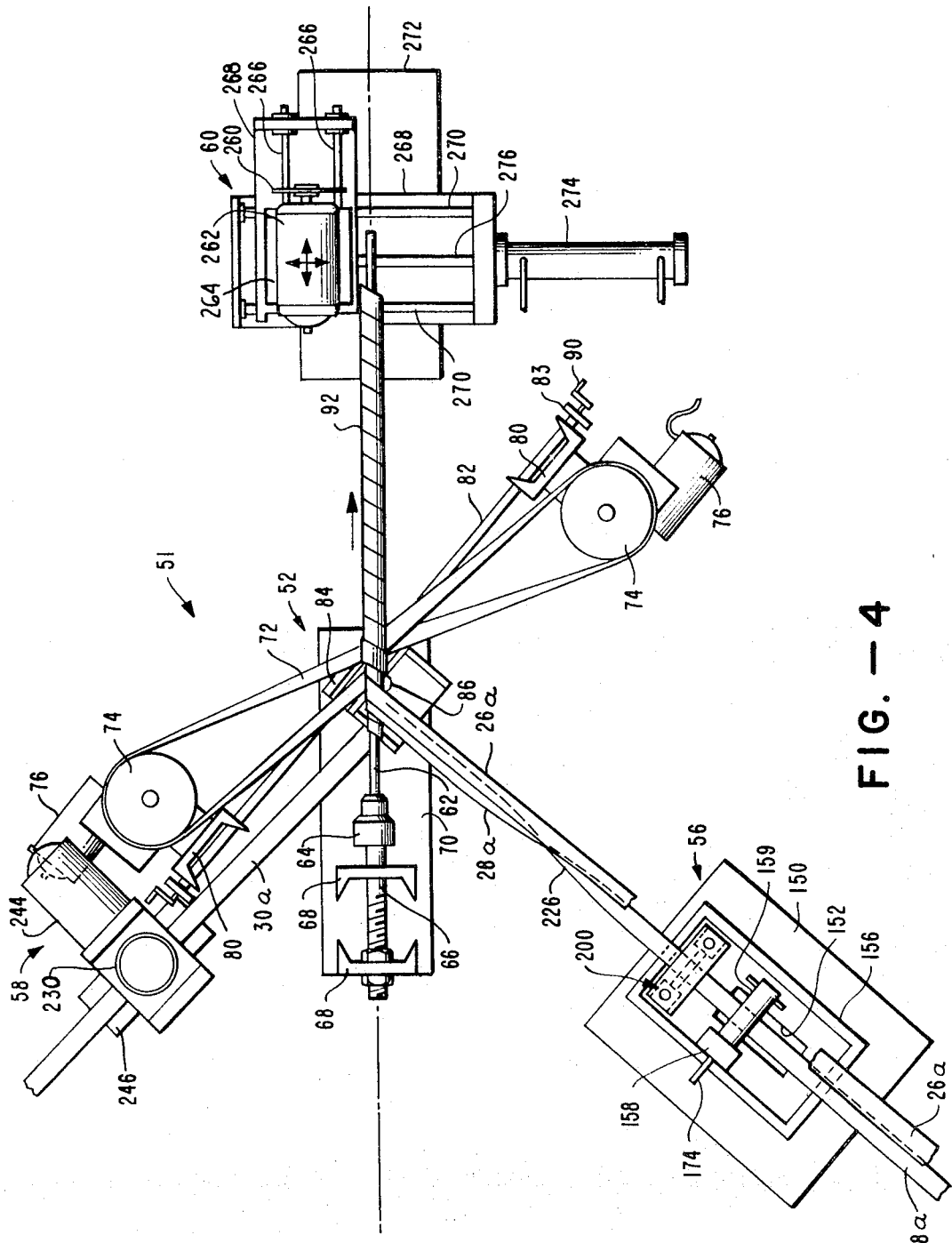

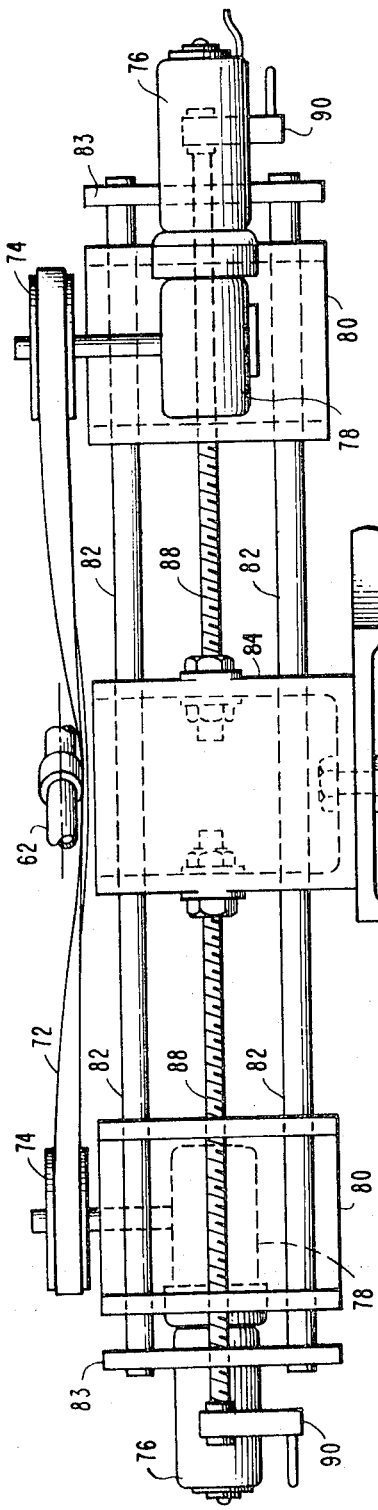
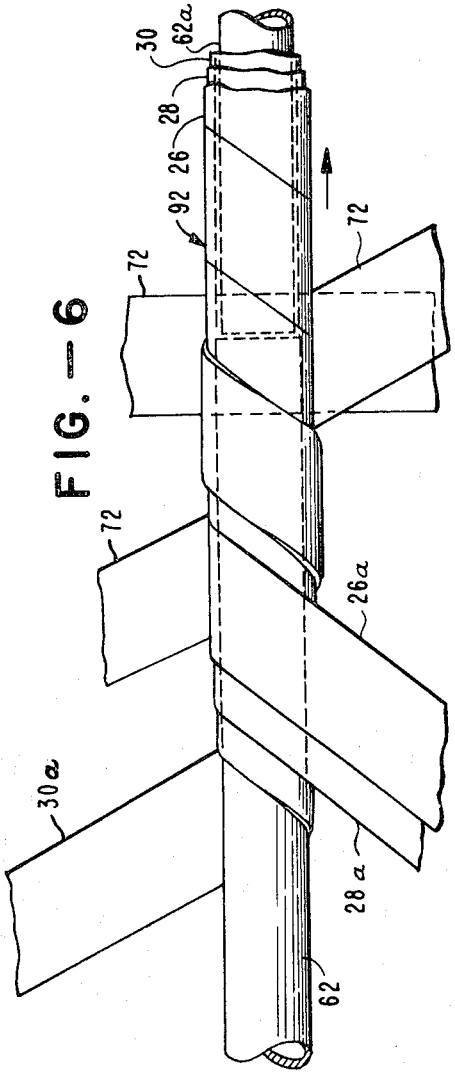
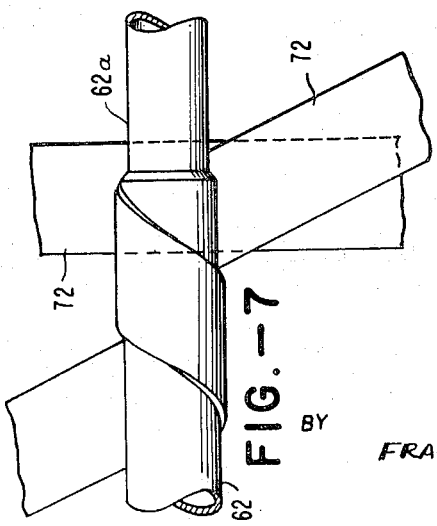

BY FRASER & BOGUCKI

ATTORNEYS

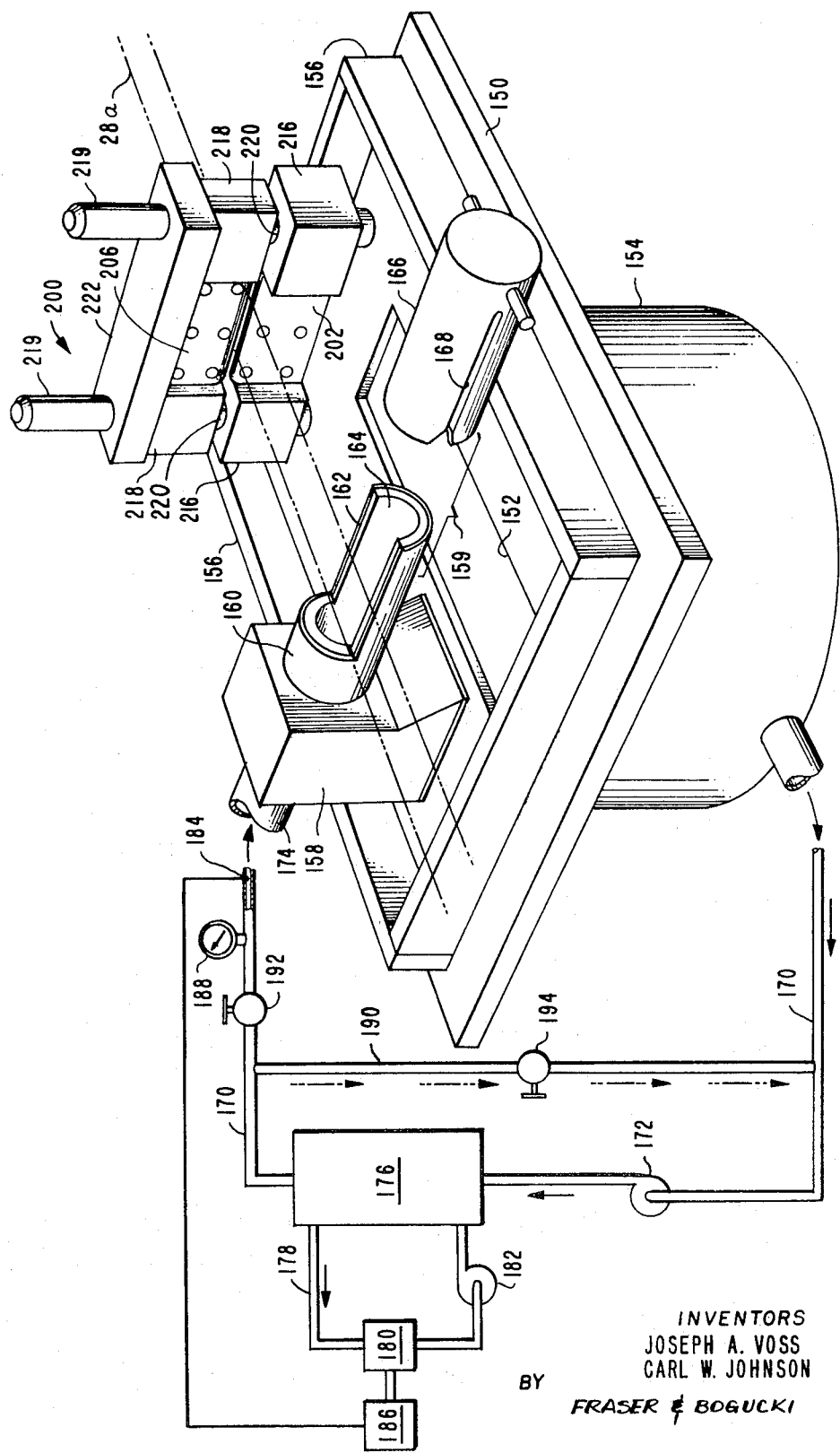

United States Patent Office 3,764,438
Patented Oct. 9, 1973

3,764,438
METHOD AND APPARATUS FOR MANUFACTURING LAMINATED TUBE STRUCTURE
Joseph A. Voss, Denver, Colo., and Carl W. Johnson, Neenah, Wis.; said Voss assignor to Kimberly-Clark Corporation, Neenah, Wis.
Original application May 3, 1968, Ser. No. 726,522, now Patent No. 3,581,744. Divided and this application July 9, 1970, Ser. No. 61,010
Int. Cl. B31c *31/00*
U.S. Cl. 156—425
11 Claims

ABSTRACT OF THE DISCLOSURE

Three strips of paper are supplied, under constant, low tension, to the fixed mandrel of a helical tube winding apparatus. A strip supply mechanism senses strip tension and, by means of a mechanical feedback arrangement, regulates the tension. The inner, mandrel-engaging strip is provided with a lubricating medium in the form of lycopodium powder supplied to the inner strip in metered fashion. Liquid adhesive is applied to all surfaces of the strip forming the intermediate ply by an adhesive-applying unit including a pair of opposed, rounded doctor surfaces for removing excess adhesive from the faces of the strip and equalizing the thicknesses of the adhesive layers on the faces. The maintenance of uniform, equally thick layers of adhesive on both faces of the strip during its travel to the mandrel from the doctor surfaces is enhanced by having the strip move through a 180° twist.

This application is a division of copending application Ser. No. 726,522, filed May 3, 1968, now Pat. No. 3,581,744.

BACKGROUND OF THE INVENTION

The present invention relates generally to improved tampon applicator devices, and particularly to improved tube structures for use in said devices and to methods and apparatus for manufacturing said improved tube structures.

U.S. Pat. Nos. 3,204,635 and 3,358,354, issued to the present inventors on Sept. 7, 1965 and Dec. 19, 1967, respectively, disclose an improved catamenial tampon applicator utlizing an external tube having a tapered forward end and an internal, tampon-ejecting tube, slidably received within the outer tube, and a method for forming the forward ends of these tubes. The tapered end of the external tube facilitates insertion of the applicator into the vagina and comprises a plurality of dovetailed folds or pleats which provide a structure easily opened from the inside, thereby permitting the user to eject the tampon without having to exert undue force. The internal, tampon-ejecting tube includes a reduced diameter, tampon-engaging forward end structured similarly to the forward end of the external tube in that it constitutes a plurality of folded or pleated sections.

Copending application Ser. No. 690,001, filed by the present inventors on Dec. 12, 1967, discloses an automatic applicator tube forming or shaping unit. By means of this apparatus, the forward end of the tube is initially crimped and then compressed into its final configuration by an appropriately shaped die which forms tightly abutting pleats. In the fabrication of the external tampon applicator tube, the compressed forward end of the tube is "exercised" to weaken the fold creases. This is accomplished by expanding the forward end of the tube to substantially its original cylindrical shape by the successive insertion of increasingly larger punches into the front end of the tube. Alternatively, the tube expansion may be accomplished in a single step. In this case, the exercising punch is moved forwardly through the front end of the tube from the inside rather than by insertion of one or more punches from the outside. Following its expansion, the forward end of the tube is recompressed into its final, tapered form. The folding, unfolding and refolding works the creases so as to provide a substantially lifeless hinge. Thus, there is no tendency for the forward end of the tube to reopen and there is little resistance when the tampon is moved through the forward end during ejection.

It will be appreciated that the yieldability of the matreial forming the external tube is an important factor not only with respect to formation of the pleats but also because it is desirable from the standpoint of consumer acceptance that the axial force or thrust necessary to spread open the forward end and eject the tampon be minimized. More specifically, it is desirable that the required axial force or thrust be reduced to one pound or less. Furthermore, upon opening of the forward end, any paper residue, dust or debris dislodged from the creases cannot be permitted to reach the vagina either directly or by way of the tampon.

It will also be appreciated that the provision of a thin-walled external tube is most desirable because in this way the overall diameter of the applicator can be minimized while maximizing the size of the tampon accommodated therein. The result is a product which has a pleasing appearance, inserts easily and simultaneously incorporates a tampon having the greatest fluid absorbing capabilities and provides the required yieldability to facilitate formation of the pleated forward end and opening thereof.

By fastening a ring about the external tube adjacent the rear extremity thereof, as disclosed in U.S. Pat. No. 3,347,234, issued on Oct. 17, 1967 to J. A. Voss, one of the inventors herein, the external tube may be re-enfocred to minimize deformation as the result of gripping pressure during use of the applicator. The ring also provides a means for securely gripping the applicator to assure proper orientation during insertion. Application Ser. No. 690,001, referenced earlier, discloses apparatus for automatically applying the rings to the external tubes.

Certain tampon applicators presently available are fabricated of plastic material, such as polyethylene. Although these applicator tubes are stronger than those made of materials such as paper, they have disadvantages which makes their use decidedly less desirable. For example, plastic applicators are obviously not disposable in a completely sanitary fashion such as by flushing down a toilet. Further, plastic applicators have thicker walls than paper applicators and thus tend to be more bulky and, like all open-ended applicators, insertion is often difficult.

The manufacture of multilayer tubes by winding strips of paper in overlapping, helical orientation on a fixed mandrel is well known. However, certain problems arise when the winding of very thin strips is undertaken. Thus, the tension of the strips, as they are wound about the mandrel, must be accurately controlled so as to assure uniformity of the final product. Further, excessive tension may cause breakage of thin strips or cause the winding machine to come to a complete stop. Hence, it is required that each paper strip be under relatively low, constant tension.

Because the strips of paper are wound under tension, substantial frictional drag forces are generated between the innermost surface of the tube and the mandrel as the tube rotates about and advances along the mandrel. This may result in torsional distortion and tearing of the tube. Although various liquid oils, such as petroleum lubricating oil, are commonly used as lubricants in helical tube winding, these are not suitable for winding thin paper strips because of the tendency to be absorbed completely by the paper and to cause discoloring of the paper during storage. In addition, petroleum based lubricating oil is a medium which promotes bacterial growth and is therefore not suitable as a lubricant for use in the winding of tampon applicator tubes.

SUMMARY OF THE INVENTION

According to a broad aspect of the present invention, a thin-walled, laminated tubular structure is provided which forms the tube stock from which hygienic media applicator devices, such as tampon applicators, may be fabricated. A three-ply construction is utilized including a thin outer ply which is opaque and has high whiteness, high strength and stiffness and an extremely smooth, coated exterior surface. The tubular structure further includes an inner ply which is thinner and less strong than the outer ply but will not readily fail as a result of repeated folding. Interposed between and bonded to the outer and inner plies is an intermediate ply comprising uncoated, short-fibered, blotter-type paper, thicker and substantially weaker than either the inner or outer ply and able to resist very little folding. The intermediate ply is further characterized by relatively low density and high porosity to allow rapid, complete impregnation and wetting of the bonding adhesive during fabrication of the tube structure.

The composite structure described above is particularly useful as stock material for an external applicator tube of the type disclosed in Pat. No. 3,204,635 because the formation of the folded end is facilitated while the axial force required to open the folded end when ejecting the tampon is mimimized. Further, the inner ply serves to trap and holds any glue particles and paper dust or fibers dislodged from the intermediate ply during unfolding of the forward end when the tampon is ejected and thereby prevents these particles and fibers from reaching the tampon and the vagina.

The internal applicator tube may also be fashioned from tube stock having the above-described laminated structure. By bonding together the various plies with a water soluble glue, the applicator device becomes completely disposable in a sanitary fashion such as by flushing down a toilet.

Another aspect of the present invention pertains to a method for making the described laminated applicator tubes in which strip material is constantly drawn from supply reels and helically wound about a fixed mandrel in overlapping, staggered relation. The method includes the application of a lubricating medium, in the form of lycopodium powder, to the surface of the strip material which engages and rides upon the surface of the fixed mandrel. The method for making the applicator tube stock also includes the step of applying a liquid adhesive to all surfaces of the blotter-type strip forming the intermediate ply and removing excess adhesive from the faces of the strip to provide equal thicknesses of adhesive on both faces, thereby precluding slippage between adjacent strips during winding and assuring the production of a uniform product. To further insure that the thicknesses of the adhesive layers on the faces of the intermediate strip are uniform and equal, the strip path is moved through a 180° twist between the point of removal of the excess adhesive and the mandrel.

According to still another aspect of the present invention, apparatus for supplying strip material to the tube-winding apparatus under constant, low tension is provided. Broadly, the strip supplying apparatus includes a rotatable platform, which may be in the form of a relatively high inertia turntable, for supporting a supply roll of the strip material, and a frictional drag or brake device engaging a surface such as the outer periphery of the rotatable platform. The strip supplying apparatus includes a means for sensing strip tension and applying to the frictional drag device a force corresponding to strip tension. When the strip tension increases, the frictional drag device is biased away from the surface of the rotatable platform to decrease the frictional drag force. The force derived from strip tension is counteracted by a biasing force applied to the frictional drag device, which tends to move the drag device toward the surface of the rotatable platform. The result is a simple mechanical feedback system which accurately controls tension at a level determined by the biasing force, which, in an elementary form, may be derived from a weight connected to the drag device.

Another aspect of the present invention pertains to a tube winding apparatus which includes means for applying liquid adhesive to the strip material which is wound about the mandrel. Generally, the adhesive applying means includes a chamber or spout through which the strip material is threaded. Liquid adhesive, which has been heated to reduce its viscosity, is supplied to the spout under pressure. All surfaces of the strip are exposed to the adhesive within the spout and the strip is therefore quickly wetted and completely impregnated. The adhesive-applying means further includes a pair of opposed, spaced, rounded doctor surfaces between which the strip material passes after it leaves the spout and which remove excess adhesive from the faces of the strip to leave uniform, equal thicknesses of adhesive on the strip. The doctor surfaces may be circular in cross section, having a radius of at least one-eighth inch.

Still another aspect of the present invention pertains to an apparatus for dispensing metered amounts of lycopodium powder onto the surface of the strip material which engages the fixed mandrel. Broadly, the dispensing apparatus includes a container for holding a supply of the powder and having in its lower portion a funnel-shaped section converging downwardly toward an opening through which the powder is free to pass. The outer periphery of a cylindrical wheel, mounted within a cylindrical cavity underneath the funnel-shaped portion, communicates with the opening at the lower end of the funnel-shaped section and is rotated by a motor so as to remove lycopodium powder from the container and deliver it to the strip material passing immediately underneath the lower extremity of the curved periphery of the cylinder. The clearance between the outer surfaces of the cylinder and the cylindrical cavity within which the cylinder rotates is uniform and approximately .002 inch so that exact metered amounts of lycopodium powder are dispensed.

BRIEF DESCRIPTION OF THE DRAWINGS

Further aspects and advantages of the present invention will be apparent from a study of the following detailed description and the accompanying drawings, in which:

FIG. 1 shows a longitudinal, cross-section view of a tampon applicator device;

FIG. 2 shows a perspective view, partially broken away, of the external tube of the applicator device of FIG. 1;

FIG. 3 shows an enlargement of a portion of the longitudinal cross-section view of FIG. 1;

FIG. 4 shows a plan view of a portion of a tube winding apparatus used in the manufacture of applicator devices such as depicted in FIGS. 1–3;

FIG. 5 shows an end elevation view of a portion of the apparatus of FIG. 4;

FIG. 6 shows an enlargement of a portion of the plan view of FIG. 4;

FIG. 7 shows an enlargement of a portion of the plan view of FIG. 4 in which the strip material used to form the tube is omitted;

FIG. 10 shows a partially exploded, partially schematic, perspective view of an adhesive applying apparatus;

DETAILED DESCRIPTION OF THE INVENTION

Figure 8:
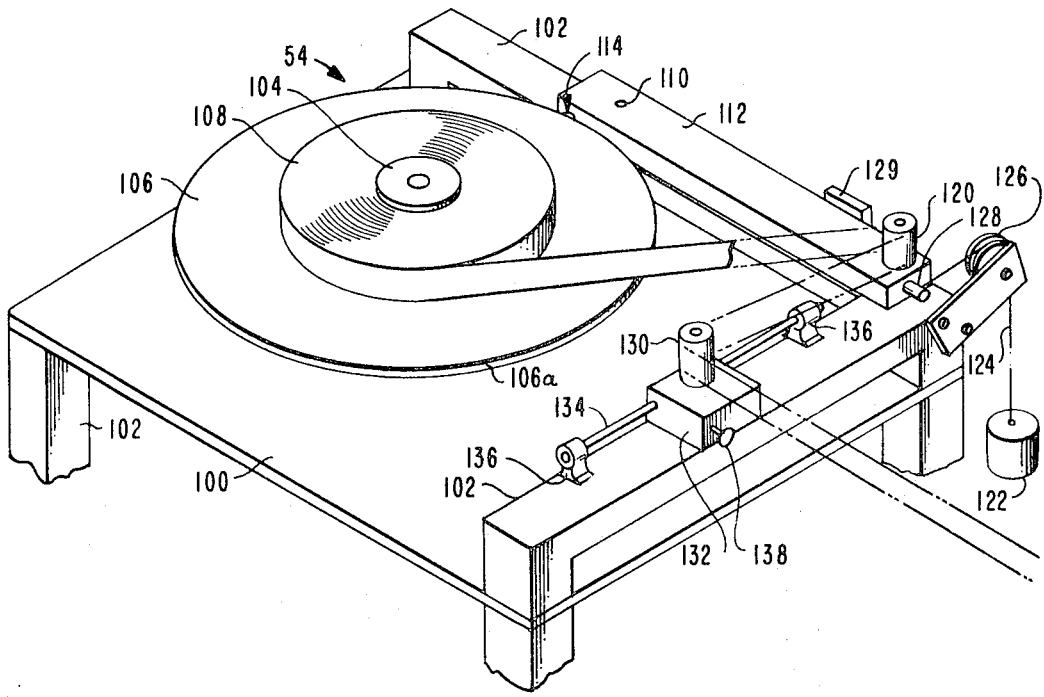
FIG. 8 shows a perspective view of an apparatus for supplying strip material to a tube winding apparatus under substantially constant, low tension.

Although the description which follows will be directed to applicators for insertion of tampon devices, it will be appreciated that other hygenic or medicinal media, such as suppositories, may be dispensed by applicators of the type discussed.

Referring to FIG. 1, a tampon applicator device 10 is depicted. The device 10 has a longitudinal axis 12 and includes an external tube 14, an internal, tampon-ejecting tube 16 disposed in telescoping fashion within the rear portion of the external tube 14, and a tampon 18 contained within the forward portion of the external tube 14.

The external tube 14 has a relatively thin, laminated wall structure, which will be described in detail below, and a forward, tapered end 20 making insertion of the external tube 14 into a vagina easy and rapid, without discomfort or irritation to the user. The forward extremity of the tampon 18 is shaped to conform to the tapered configuration of the interior of the forward end 20 of the tube 14.

A re-enforcing and gripping ring 22 is secured about the exterior surface of the external tube 14 in accordance with the teachings of U.S. Pat. No. 3,347,234, mentioned earlier. The rear extremities of the tube 14 and the ring 22 are flush to provide a relatively large surface area and eliminates the sharp rear edge of the tube 14.

The forward end 20 of the external tube 14 comprises a series of overlapping, tightly abutting pleats or folds, the structural aspects and formation of which are described in detail in aforementioned U.S. Pat. Nos. 3,204,-635 and 3,358,354 and application Ser. No. 690,001. Briefly, the forward end of the external tube 14 is initially crimped or partially folded and then compressed within a generally cone-shaped die to fully hold the tube end. Next, the folded end is "exercised." The object of this operation is to weaken the fold lines and thereby reduce the axial force required to eject the tampon during insertion. The "exercising" operation provides a substantially lifeless hinge at each of the folds or creases and almost completely precludes what would otherwise be a tendency on the part of the folded forward end to spring back to its original shape. The ultimate goal is a completely dead soft fold. Broadly, "exercising" is accomplished by substantially fully unfolding or expanding the completely folded tube end and then refolding and compressing the tube end within a generally cone-shaped die. During this final step, a centrally located pin, mounted within the die, is used to form a small aperture 24 in the tip of the tube 14 to facilitate the subsequent unfolding during use by assuring that the folds are symmetrically disposed about the longitudinal axis 12 of the tube.

The foregoing underlines the need for a tube material which will readily assume the desired tapered shape without "spring back" or undue resilience and which will provide a tube end which may be opened with a minimum amount of force during ejection of the tampon.

Referring to FIGS. 2 and 3, it will be seen that the external tube 14 comprises a composite, laminated structure including an outer ply 26, an intermediate ply 28 and an inner ply 30. As will be described in greater detail below, the tube 14 is formed by continuously winding three strips of paper 26a, 28a and 30a in overlapping, helical fashion about a mandrel by a movable belt wrapped about the mandrel. Helical butt joints 32, 34 and 36 are thereby produced in plies 26, 28 and 30, respectively. In accordance with one example of the external tube 14, the strips 26a, 28a and 30a, forming the plies 26, 28, and 30, respectively, are about 1⅛" wide. Because the diameters of the plies are progressively larger toward the outside of the tube, the intermediate strip 28a is about .015" wider than the inner strip 30a and the outer strip 26a is about .015" wider than the intermediate strip 28a to assure that the edges of the strips butt together.

The width of the strip material is not critical; for a given width, the adjustments which must be made in the winding operation will be evident to those skilled in the art. One factor which must be considered is the width of the drive belt winding the strip material about the mandrel. It is preferable that the widths of the belt and strips be equal so that the complete width of the strip will be under compression.

Much of the strength of the tube is determined by the use of three plies rather than two. It will be evident that if a two ply construction were employed, only a single layer of paper would be present at a given butt joint to provide structural strength. Some weakness, of course, could be avoided if the butt joint gaps were reduced to substantially zero. However, a very small gap between the adjacent edges of the strip must be assumed because it is impossible, from a practical standpoint, to reduce the gap to zero along the entire length of the joint.

It is further important to note that the strips used to form the three plies are wound in staggered, overlapping relation with respect to one another. In this way, the spiral butt joint of any one ply will be displaced from, that is, out of registry with, the butt joint of any other ply. This arrangement provides maximum strength in the wall of the tube.

The outer play 26 of the tube 14 is made from high quality, opaque paper having a caliper or thickness ranging between .003 and .004 inch. The exterior surface of the outer play 26 is provided with a smooth, non-wettable coating 38. The coating may be of the "earthen" clay kind typically employed in the manufacture of high quality packaging to give a glossy appearance. Alternatively, a silicone coating may be used. The function of the coating 38 is to provide the exterior surface of the tube 12 with an extremely smooth, slippery texture which is non-absorbent. The outer ply 26 may also be characterized as having high whiteness and high strength, with greater stiffness than the intermediate and inner plies 28 and 30.

The ply 26 has a fiber composition comprising approximately 76% bleached hardwood Kraft and 24% bleached softwood Kraft. The basis weight of the paper forming the outer ply 26 is about 17 to 18 pounds per 1000 square feet with a density of approximately 60 pounds per cubic foot.

As already mentioned, the fold strength of the material constituting the exterior tube 14 is significant because the forward end 20 must not only be easily formed into the desired tapered configuration but must also open easily under the influence of a small, axially-directed tampon-ejecting force, preferably about one pound or less. In the example under discussion, in terms of number of double folds to failure, the fold strength of the outer ply paper in the machine direction is approximately 75 double folds and in the cross machine direction, 48 double folds. [Fold endurance data for the outer play 26, as well as for the intermediate and inner plies 28 and 30, were obtained using an MIT (Massachusetts Institute of Technology) Folding Endurance Paper Testing Machine manufactured by the Tinius Olsen Testing Machine Company of Philadelphia, Pa. Tests were in accordance with ASTM (American Society for Testing Materials) specification D–643.]

Because all of the plies are wound in a helical direction, the fold lines in the tapered forward end of the finished applicator tube, directed generally parallel with the longitudinal axis 12, will not be parallel to either the machine or cross machine direction. The actual fold strength will therefore lie somewhere between the machine and cross machine fold strengths and may be presumed to be approximately the average of the two. It should be noted however, that the finished assembly comprising all three plies, bonded together by suitable adhesive, will not have fold endurance characteristics which can be readily computed from the endurance characteristics of the individual plies before being bonded together. Thus, the fold endurance data is solely for the purpose of specifically identifying and describing by physical characteristics the material that is used for individual plies prior to being bonded together.

In accordance with the Sheffield Paper Smoothness Test, the exterior coating 38 on the outer ply 26 provided 8.4 units of air flow denoting an extremely smooth surface. For this test, the coating 38 comprised glazed "earthen" clay. In contrast, the unglazed interior surface of the outer ply 26 provided 84.2 Sheffield flow units.

The intermediate ply 28 of the external tube 14 is an uncoated, relatively thick, blotter type, short-fibered paper of relatively poor quality. As a result of the shortness of the constituent fibers, this ply has the important attribute of being able to resist very little folding. The approximate fiber composition is 7% bleached softwood Kraft, 6% bleached hardwood Kraft and 87% groundwood, the latter being a very short fiber. The approximate distribution of fiber length in the intermediate ply 28 is as follows: 76% short (0.0 to 1.0 mm.), 21% medium length (1.0 to 2.5 mm.) and 3% long (2.5 to 4.0 mm.).

In the example under discussion, the basis weight of the intermediate ply 28 is about 15.5 pounds per 1000 square feet with a density of about 34.5 pounds per cubic foot. This relatively low density indicates high porosity which makes the intermediate ply particularly liquid absorbent. The caliper or thickness of the intermediate ply 28, in the example under discussion, falls within the range of about .005 to .006 inch. As mentioned, the fold endurance is extremely low, requiring only 7.4 double folds to failure in the machine direction and 4 double folds to failure in the cross machine direction utilizing the MIT Folding Endurance Paper Testing Machine referenced earlier. When adhesive is applied to both faces of the paper strip used to form the intermediate ply 28 and allowed to set, the fold endurance is substantially decreased, averaging one double fold to failure. Thus, it may be presumed that in the final product, as a result of the exercising operation, the intermediate ply 28 is probably fractured at the fold lines.

Another highly significant property of the paper forming the intermediate ply 28 is its tensile strength. In the tampon applicator tube stock manufacturing technique to be described in detail later, the strips forming the plies 26, 28, and 30 are drawn and wrapped about a fixed mandrel by means of a movable belt encircling the mandrel. It is important to maintain a constant, low tension on each of the strips to produce tubes of uniformly high quality and keep the winding machine operating properly. Whereas the strips forming the outer and inner plies 26 and 30 do not present any particular problem with respect to breakage during winding because of their relatively high strength, the intermediate ply strip material, because of its relatively low grade, is susceptible to breakage. The dry tensile strength of the paper employed for the intermediate ply 28 is approximately 14.1 pounds per inch width in the machine direction and 7.4 pounds per inch width in the cross machine direction. The wet tensile strength, following a 30-second soak in water, is 2.36 pounds per inch width in the machine direction. The foregoing data is based upon tensile strength tests performed in accordance with ASTM standard D828-60.

The inner ply 30, in accordance with one example, may comprise glazed tissue between .002 and .003 inch thick. The fiber type is substantially 100 bleached softwood Kraft and the paper has a basis weight of 9.38 pounds per 1000 square feet and a density of about 50 pounds per cubic foot. The inner ply 30 functions not only to provide added strengths to the final product, but also to trap debris in the form of particles or dust which may be dislodged from the intermediate ply 28 during unfolding. It is thus necessary that the inner ply 30 have sufficient fold endurance to preclude the possibility of failure at the crease lines. Inner ply material having the properties described above endured 993 double folds before failing in the machine direction and 471 double folds in the cross machine direction.

The inner ply tissue is provided with a glazed exterior side which is adhered to the intermediate ply 28 and which is quite smooth, having a Sheffield smoothness of 94 units of air flow. The unglazed interior surface of the inner ply 30 is somewhat rougher, providing 225 units of air flow under the Sheffield smoothness test. The dry tensile strength, determined in accordance with ASTM standard D828-60, is 18.4 pounds per inch width in the machine direction and 11.9 pounds per inch width in the cross machine direction. The Gurley Stiffness Test performed on this paper indicated 33.52 stiffness units in the machine direction and 31.52 stiffness units in the cross machine direction.

The foregoing data, pertaining to the paper constituting the various plies, relate to specific examples; variations in the different parameters can, of course, be tolerated. For example, with respect to basis weight, caliper, and densities, variations of ±25% are acceptable.

In the fabrication of the applicator tubes, liquid adhesive is applied to the strip 28a forming the intermediate ply 28 in a manner to be described. The strip 28a, because of its blotter-type nature, readily and completely absorbs the adhesive. The adhesive is preferably of the type that dries very brittle, so that it fractures readily and adds little or no resistance to opening of the tapered front end of the tube 14 when the tampon is ejected. This adhesive is further preferably water soluble to enable complete and rapid disposal of the applicator device in water. The plies 26, 28 and 30 thus quickly separate and soften as a result of becoming saturated with water. Subsequent disintegration of the paper precludes clogging of pipes and sewage systems. A commercially available adhesive which meets the foregoing requirements is adhesive No. 2706 manufactured and sold by Swift & Company of Chicago, Ill. This adhesive is light colored and has a dextrin base. At room temperature, it is relatively viscous, of the order of 50 poises. When heated, however, it is decidedly less viscous.

The internal tube 16 may be formed from three ply tubular stock, including outer ply 40, intermediate ply 42 and inner ply 44, similar to that described in connection with the external tube 14. The criteria which must be met by the internal tube 16 is obviously not as stringent as that which must be met by the external tube 14, in which the formation of the forward end 20 must be facilitated and the end 20 must unfold with minimum resistance during ejection of the tampon. However, the three ply construction described in connection with the tube 14 not only provides a similarly-structured tube 16 with high strength but facilitates the formation of the pleated, reduced diameter, forward end 17, which formation is described in greater detail in the aforementioned U.S. Pat. 3,358,354 and the co-pending application Ser. No. 690,001. Use of an internal tube 16 having the described construction including a smooth exterior coating, also helps minimize the force required for ejection of the tampon because the tube 16 slides easily, with minimal frictional resistance, within the external tube 4.

The re-enforcing ring 22 is preferably made from tube stock which is heavier than that used for the external and internal tubes 14 and 16. The ring tube stock can, according to one example, comprise three plies 46, 48 and 50 of hard, unfinished paper about .006" thick. This structure not only provides substantial re-enforcing, but provides a good gripping surface for the finger. The ring, in the example under consideration, is ⁹⁄₁₆" long and its rear edge is positioned flush with the rear extremity of the external tube 14 thereby eliminating what would otherwise be a sharp edge by providing a relatively large surface area against which the finger, used to advance the internal tube 16 during ejection of the tampon, comes to rest.

Turning now to FIGS. 4-13, there is shown a tube winding machine 51 of the well-known type in which a plurality of paper strips are helically wound around a fixed mandrel by an endless,, movable belt wrapped about the mandrel. The belt engages the strips to wind them into a continuous tube advanced along the mandrel, the tube subsequently being cut to the desired lengths.

The machine 51 comprises generally a winding apparatus 52, means, designated generally by reference numeral 54, for supplying strip material to the winding apparatus 52 under constant, low tension, adhesive applying means 56, lubricating medium dispensing means 58 and tube cutting means 60.

Turning now to FIGS. 4-7 in particular, the tube winding apparatus 52 includes a mandrel 62 having a circular cross section and supported in horizotnal, cantilevered fashion by a chuck 64. The chuck 64 is secured to a shaft 66 supported by a pair of posts 68 extending upwardly from a base 70.

A drive belt 72, under tension, encircles the mandrel 62 in a helix, as best shown in the enlarged views of FIGS. 6 and 7. As already stated, the width of the belt 72 is preferably equal to the width of the strips to be wound so that the strips are subject to pressure across their entire widths.

The belt 72 is looped at each end about a drive pulley 74 driven by an electric motor 76 through an appropriate transmission 78. The pulley 74, motor 76 and transmission 78, are mounted on a support plate 80 mounted for sliding, horizontal movement along a pair of vertically spaced, horizontally oriented guide shafts 82 carried by a central upright member 84. The shafts 82 terminate, at their outer ends, in end plates 83. The upright 84 is secured to the base 70 by a single bolt and nut fastener 86. By loosening the fastener 86, the belt drive mechanism may be rotated to the appropriate angle relative to the mandrel 62. For purposes of winding applicator tubes disclosed herein, an angle of about 35° is satisfactory although this may be varied in accordance with specific requirements.

The position of the support plates 80 along the guide shafts 82, and hence, the tension of the belt 72, may be adjusted by means of lead screws 88 supported at their opposite ends by the central member 84 and the end plates 83. The lead screws 88 threadedly engage the support plates 80 and a hand wheel 90 secured to the outer end of each lead screw 88 provides the desired translation of the support plate 80.

As the tube stock, designated by reference numeral 92, formed by the belt 72, advances along the mandrel 62 (in a direction to the right as viewed in FIG.4), substantial frictional resistance or drag between the tube stock 92 and the mandrel 62 may be encountered. In the case of very thin walled tubes, such as those forming part of the present invention, twisting and tearing of the tube may result. To eliminate this problem, the mandrel 62 is undercut, that is, provided with a reduced diameter portion 62a, as shown in the FIGS. 6 and 7, so that only light, intermittent contact is present along this portion between the mandrel and the tube stock. According to one example of a mandrel used for forming tube stock for the external tube 14, the larger diameter of the mandrel is .578 inch and the undercut portion has a diameter of .547 inch.

Although the tube winding machine 51 will be described in detail in connection with the manufacture of tube stock for the external tube 14, it is to be understood that the fabrication of stock for the internal tube 16 and the re-enforcing ring 22 are accomplished in substantially identical fashion.

In the manufacture of tube stock for the external tube 14, the three strips 26a, 28a, and 30a are fed simultaneously and continuously onto the mandrel 62 by the belt 72. The strip 26a forms the outer ply 26 of the finished tube 14, the strip 28a the intermediate ply 28 and the strip 30a the inner ply 30. Although all of the strips may be fed from one side of the mandrel 62, in the apparatus under consideration, the inner strip 30a is fed from the side opposite the strips 26a and 28a to eliminate interference between the adhesive applying means 56 and the lubricant dispensing means 58.

The various strips are fed onto the mandrel 62 in overlapping, staggered relation. Appropriate means (not shown) are provided for guiding and maintaining the proper overlapping relationship between the individual strips. The amount of overlap is not critical so long as the butt joint in any one ply is not in alignment with the butt joint in the final product. The amount of overlap between the outer ply and the intermediate ply can be the same as that between the intermediate and inner plies or it can be different. For strips 1⅛" wide, overlaps may typically range from ¼" to ½".

The tension of the strips 26a, and 28a, and 30a are of substantial importance from the standpoint of producing tubes having uniform wall thickness, diameter and quality. It is essential that the strips 26a, 28a, and 30a be wound onto the mandrel under substantially constant, low tension. For the strip material described, it has been found that tensions of 6 to 8 pounds on the outer strip 26a, 6 to 8 ounces on the intermediate strip 28a and about 2 pounds on the inner strip 30a are satisfactory. These values apply for a relative humidity of approximately 25%. Significant changes in tension result from changes in humidity; therefore, the tubes described herein are normally wound in a controlled humidity environment so that the required tensions can be accurately determined and maintained.

Figure 9:
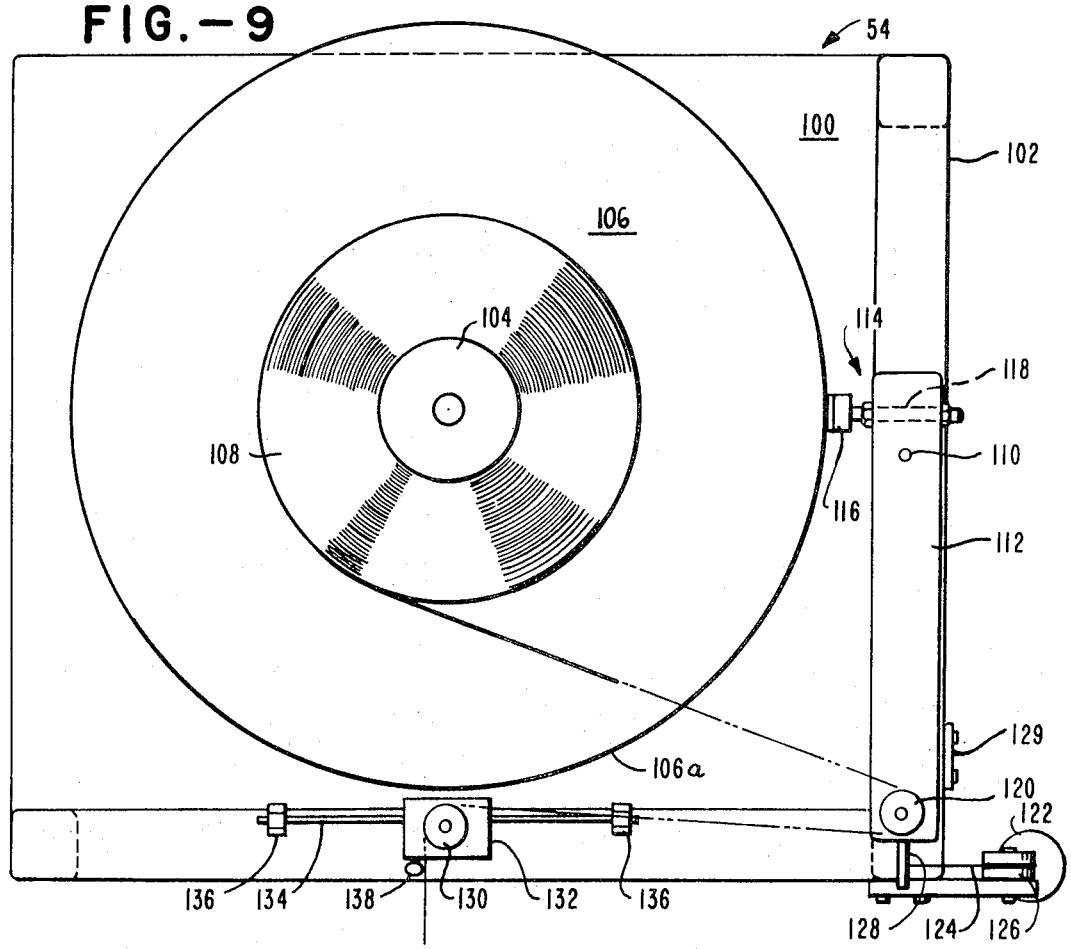
FIG. 9 shows a plan view of the apparatus of FIG. 8.

Referring to FIGS. 8 and 9, the means 54, for supplying the strip material to the mandrel under constant, low tension will now be described. Each strip may be supplied by one of the means 54, the individual supply means being adjusted to provide the necessary tension for the particular strip being supplied.

The strip supplying means 54 comprises a base plate 100 supported by a suitable frame 102 and carrying a spindle 104 freely rotatable within a bearing (not shown) mounted in the base plate 100. Attached to the spindle 104 is a rotatable means or turntable 106 in the form of a circular, relatively heavy metal plate. A portion of the spindle 104 projects upwardly from the horizontal turntable 106 for receiving a supply roll 108 of strip material. The supply roll 108 is keyed to the spindle 104 so that the spindle 104, turntable 106 and supply roll 108 all rotate together. The mass of the turntable 106 is relatively high compared to that of the supply roll 108 and once brought up to speed, the turntable tends to maintain a constant angular velocity irrespective of changes in the diameter of the unwinding supply roll 108 and irrespective of short term, that is, high frequency variations in supply roll tension.

Pivotally mounted on the frame 102 at point 110, and positioned adjacent the outer periphery 106a of the turntable 106, is an arm 112 carrying at one end a frictional drag means 114 for engaging the outer periphery 106a. The frictional drag means 114 includes a small shoe 116, made of rubber or other high friction material, carried by fastener means 118 secured to the arm 112. The fastener means 118 permits lateral adjustments to be made to the position of the shoe 116 relative to the arm 112. The pivot point 110 of arm 112 is relatively close to the end of the arm carrying the frictional drag means 114 so that a substantial mechanical advantage is provided.

Mounted on the other end of the arm 112 is an upright, freely rotatable roller 120 about the strip material is looped. The function of the roller 120 is to sense the tension of the strip material and to transmit this tension force to the long end of the arm 112.

Means for biasing the arm 112 in opposition to the force applied to the arm by virtue of the tension in the strip material, is also provided. The biasing means may take any suitable form, so long as the biasing force on the arm is substantially constant. A simple way of accomplishing this is shown in FIGS. 8 and 9 and include a weight 122 on the end of a wire 124 looped about an idler pulley 126. This wire 124 is attached to the arm 112 by means of a pin 128 projecting from the end of the arm. A stop 129, mounted on the frame 102, limits the outward movement of the arm 112.

The strip material leaving the roller 120 passes about a second roller 130. The roller 130 is mounted upon a block 132 for free rotation and is positionable along a rod 134 mounted spanning a pair of spaced brackets 136 carried by the frame 102. Once chosen, the position of the roller may be fixed with respect to the frame by tightening a clamping screw 138, threadedly received by the block 132, against the rod 134.

During operation of the strip material supply means 54, the brake shoe 116 is pressed against the periphery 106a to a greater or lesser extent depending upon strip tension. If the tension of the strip material increases, caused, for example, by greater unwinding resistance in the supply roll, the arm 112 is drawn clockwise about the pivot 110 against the biasing force of the weight 122, to reduce the frictional drag force of the brake shoe 116. The force required to unwind the supply roll, and hence the tension of the strip material, thereby decreases until equilibrium is reached once again. On the other hand, should the strip material tension decrease, the biasing force provided by the weight 122 tends to overcome tension force to move the arm 112 counterclockwise and press the shoe 116 against the periphery 106a with greater force, thereby increasing the strip tension. When the device is in equilibrium, a slight amount of frictional drag is applied to the turntable periphery 106a and the tension and weight forces on the arm are equal and opposite. It will be appreciated that the frictional drag device is not as effective in coping with short term or high frequency fluctuations in strip tension but is most effective in regulating tension for long term or low frequency variations while the rotating inertia of the turntable smooths out the high frequency fluctuations.

Figure 11:
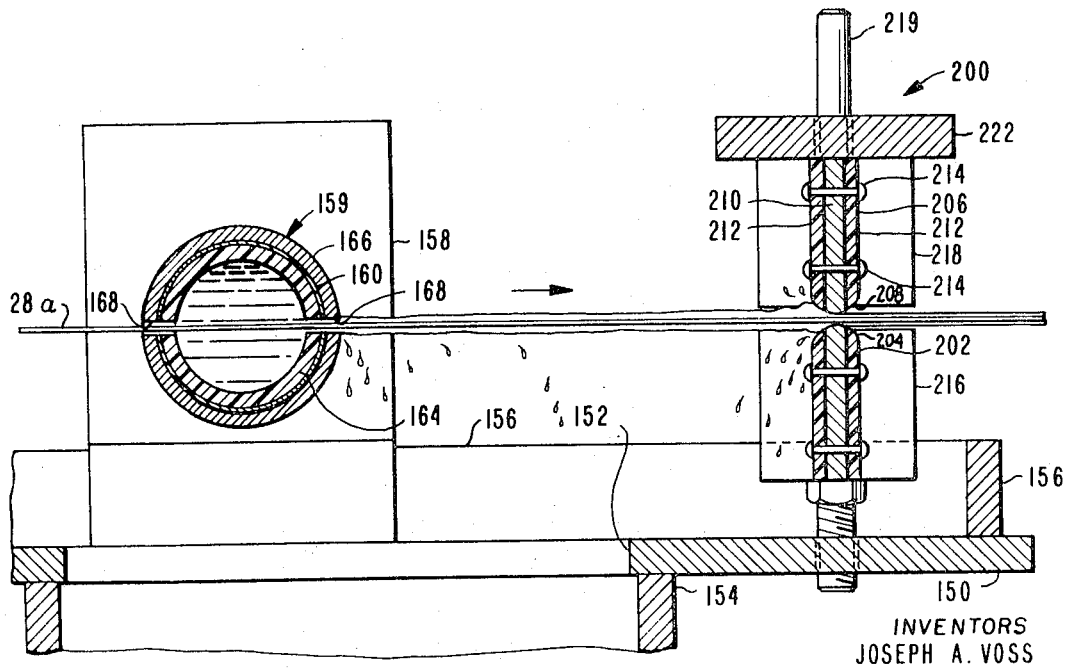
FIG. 11 shows a longitudinal, cross-section view of a portion of the adhesive applying apparatus depicted in FIG. 10.

The adhesive applying means 56 depicted in FIGS. 10 and 11, impregnates the intermediate strip 28a with a liquid adhesive and provides uniform, equal adhesive coatings on both faces of the strip. The adhesive applying means 56 includes a platform 150 mounted on a suitable frame means (not shown). The platform 150 is provided with an elongated rectangular opening 152 in its central portion. An adhesive reservoir 154, in communication with the opening 152, depends from the platform 150. Bordering the platform on all sides is a fence 156 which prevents adhesive from spilling over the edges of the platform 150. Mounted on the platform 150 within the enclosure defined by the fence 156 is a vertical support member 158 carrying a spout assembly 159 which according to one example, includes a horizontally projecting tube 160. The upper half of the tube 160 is cut away along a portion of its length forming a step 162. The interior wall of the tube 160 may be provided with a plastic liner 164 to facilitate cleaning of the tube. A cap 166, generally cylindrical in shape and provided with central, horizontally oriented, oppositely disposed slits 168, encloses the tube 160 during operation and completes the spout assembly 159. The intermediate ply strip material 28a passes through the slits 168 for exposure, on all sides, to the adhesive supplied to the interior of the tube 160.

A conduit 170, which includes a pump 172, interconnects the bottom of the adhesive reservoir 154 with a pipe 174 supported by the member 158 and communicating with the interior of the tube 160. Adhesive from the reservoir is thus circulated to the tube 160 and any overflow passes down through the opening 152 back into the reservoir 154. It will be noted that the plane of the strip 28a is substantially parallel with the stream of adhesive within the spout assembly, that is, the adhesive stream is directed against one of the edges of the strip. This eliminates any tendency on the part of the strip to bow or otherwise deflect within the spout as a result of the force of the adhesive stream.

The viscosity of the adhesive must be such that it quickly penetrates and completely wets the strip material 28a. As a result, as little time as possible is lost in this process and a relatively high strip velocity can be maintained. Swift & Company Adhesive No. 2706, referenced above, is a high viscosity adhesive at room temperature but is decidedly less viscous when heated. An adhesive temperature of between 150° and 160° F. has been found particularly satisfactory. At lower temperature, the adhesive is too viscous; at higher temperatures, chemical breakdown of the adhesive begins. The reduced viscosity of the adhesive not only assures complete, rapid saturation of the intermediate strip material but makes the adhesive become tacky more quickly so that the winding apparatus can be run at a higher speed. Complete impregnation of the strip material by the adhesive assures that the desired ultimate brittleness in the finished tube will be obtained. Also, if the strip material, including the edges, is not completely impregnated, an inferior finished product results. This shows up as small flags of unadhered paper protruding forwardly from the tapered forward end 20 of the exterior tube 14 after the tube has been opened by the ejected tampon and destroys the smooth outer surface of the tapered end of the tube. Further, if the strip material is not tacky as it is wound about the mandrel, the inner and outer strips 30a and 26a may slip with respect to the intermediate strip 28a and this will upset the winding operation. The belt 72 engages only the outer strip 26a and if the adhesive is not sufficiently tacky, slippage will occur between it and the other layers. Maintaining the adhesive at a low viscosity also substantially reduces the force required to draw the intermediate strip 28a through the doctor mechanism to be described later. This is especially significant with respect to the intermediate strip which is weak in the dry state and very weak when soaked.

Temperature control of the adhesive is accomplished by a heat exchanger 176 surrounding the conduit 170 downstream of the pump 172. Hot water is circulated by a pump 182 through a closed circuit 178 into and out of the heat exchanger 176 from a supply tank and heater unit 180. A temperature sensor 184, in contact with the adhesive at a point near its entry into the tube 160, is connected to a thermostat control system 186 which regulates the operation of the heater in the unit 180. A temperature gauge 188, for observing the adhesive temperature, is connected to the conduit 170 near the temperature sensor 184. A bypass line 190, connected across the series combination of the heat exchanger 176 and pump 172 is used to regulate the flow of adhesive to the tube 160. For this purpose, a first valve 192 is connected in the conduit 170 and a second valve 194 is provided in the bypass line 190. By adjusting the valves 192 and 194 the flow from the pump 172 can be split so that the required amount of adhesive is supplied to the tube 160.

During operation of the apparatus described thus far, adhesive is supplied to the spout 159 under pressure by the pump 172 so that adhesive fills substantially the whole interior of the spout to thoroughly wet both faces and both edges of the strip material 28a. In one practical example, the pressure at the pump outlet is 40–50 p.s.i. The pressure drop between the pump outlet and the spout 159 is substantial; the pressure at the spout should be sufficient to fill the spout interior and prevent formation of bubbles within the spout which would result in dry spots on the strip 28a.

After leaving the tube 160, excess adhesive is removed from both faces of the strip material 28a by a doctor mechanism 200. The doctor mechanism 200 includes a lower, vertically oriented plate assembly 202 having an upper, horizontally oriented, rounded edge 204 and an upper plate assembly 206 disposed coplanar with and spaced apart from the lower plate assembly 202. The upper plate assembly 206 has a lower horizontal, rounded edge 208 substantially identical to the edge 204 of the lower plate assembly and positioned parallel thereto. The rounded edges 204 and 208 are preferably circular in cross section as shown in FIG. 11 and have a radius of at least 1/8". The lower and upper plate assemblies 202 and 206 are similarly constructed, composite units. Using the upper plate assembly 206 as an example, the lower assembly 202 being substantially identical, a metal core 210 is sandwiched between a pair of easily cleaned plastic sheets 212, the three layer structure being held together by suitable fasteners 214.

As best shown in the perspective of FIG. 10, the plate assembly 202 is carried between lateral blocks 216 and the plate assembly 206 is similarly carried between blocks 218. A pair of vertical posts 219 secured to the platform 150 extend through vertical holes formed in the blocks 216 and 218. The proper spacing between the rounded edges of the plate means is furnished by spacers 220 interposed between the blocks 216 and 218. The plate means 206 is biased downwardly by a weight 222 having spaced-apart apertures for receiving the posts 219. The weight 222 is necessary because the adhesive which bunches up on the entry side of the doctor mechanism 200 tends to lift the upper plate assembly.

The rounded doctor surfaces assure a uniform coating, of equal thickness, on both faces. If a relatively sharp-edged or knife blade is used, as has been the practice in the past, the strip material tends to ride against one or the other blade edge resulting in almost complete removal of the adhesive from that face. With rounded edges, a hydraulic wedge is formed on each face of the strip material which tends to center the strip material as it passes between the doctor surfaces.

Disassembly of the doctor mechanism 200 for cleaning is accomplished simply by lifting the weight 222, the upper plate assembly 206 and the lower plate assembly 202 off the posts.

By way of example, for strip material having a thickness of .006 inch, the spacing between the rounded edges 204 and 208 of the plate assemblies, at their closest proximity, is maintained at .007 inch to form a layer of adhesive .0005 inch thick on each face of the strip material. By the time the strip material 28a reaches the mandrel, the adhesive is sufficiently tacky so that the inner and outer strips 30a and 26a readily adhere. The thickness of the adhesive layer is somewhat thinner than .0005 inch by the time the strip reaches the mandrel because of evaporation; after complete drying of the tube, the presence of the adhesive is not discernible by measuring the thickness of the wall which is approximately the total of the thicknesses of the individual plies. The proper tackiness of the adhesive can be achieved by experimentation. Some factors to observe and which will be readily apparent to those skilled in the art, include the ambient temperature and humidity, the winding speed and the distance between the mandrel and the glue applying unit.

With respect to the distance between the exit of the spout assembly 159 and the entry to the doctor mechanism 200, a sufficient separation must be provided so that the adhesive may soak into the strip material completely before the doctor mechanism 200 is reached. The separation distance must be increased with increasing operating speeds. By way of example, with a strip speed of about 50 feet per minute, a separation distance of about eight inches is satisfactory.

As already stated, proper operation of the winding apparatus and the quality of the ultimate product is affected by the thickness of the adhesive applied to the faces of the intermediate strip 28a. The requirement that the adhesive be tacky or partially set when the strip 28a reaches the mandrel 62 dictates that a sufficient distance separate the exit point of the doctor mechanism 200 from the mandrel 62. For a strip velocity of 50 feet per minute, this distance may be of the order of four feet. It has been found, however, that in the version of the apparatus in which the strip is oriented horizontally while passing through the spout 159, in the doctor mechanism 200 and the mandrel 62, there is a tendency for the adhesive to accumulate to some extent on the lower surface of the strip. This can result in occasional slippage between the intermediate strip 28a and the inner strip 30a, the adhesive on the lower surface of the strip 28a not having had the opportunity to set to the necessary extent. On the other hand, the depleted layer of adhesive on the upper surface of the strip 28a causes this layer to set rather quickly and results in occasional dry spots where there is little or no bonding between the intermediate and outer strips. The result is a tube of inconsistent quality and an excessive waste of tube stock. This problem was eliminated by providing the intermediate strip 28a with a 180° twist as indicated by the reference numeral 226 in FIG. 4, between the doctor mechanism 200 and the mandrel 62. The twist is effective to prevent accumulation of the adhesive by gravity on one surface at the expense of the other since each surface faces upwardly for a portion of its travel to the mandrel and downwardly during the remaining portion.

With minor modifications, which will be readily apparent to those skilled in the art, the spout assembly 159 and doctor mechanism 200 may be oriented vertically. In this case, the strip 28a, which comes off the supply roll vertically, passes through the spout assembly and doctor mechanism without twisting and only a 90° twist is required between the doctor mechanism and the horizontal mandrel 62. Excess adhesive flows off the vertically oriented portion of the strip leaving adhesive coatings of substantially equal and uniform thickness on both faces of the strip.

Because of the frictional forces created between the fixed mandrel 62 and the rotating inner ply 30 of tube stock 92, it is necessary to lubricate the mandrel surface in a continuous, controlled fashion to permit the inner ply to slide over the mandrel surface more easily. Without some form of lubrication, in view of the tension on the strips and the force exerted by the belt 72 on the tube stock being formed, there may be twisting and tearing of the tube material. One way to reduce this problem has already been discussed, namely, the provision of a reduced diameter portion on the mandrel 62. However, some form of lubricating medium must be applied to the inner strip to prevent tearing of the tube before it reaches the reduced diameter portion. It has been found, in accordance with one aspect of the present invention, that lycopodium powder provides an excellent lubricating medium for the winding of tubes used for hygienic media applicator devices. This powder, however, is so finely divided that it flows like a low viscosity liquid and difficulty is encountered in metering its flow.

Figure 12:
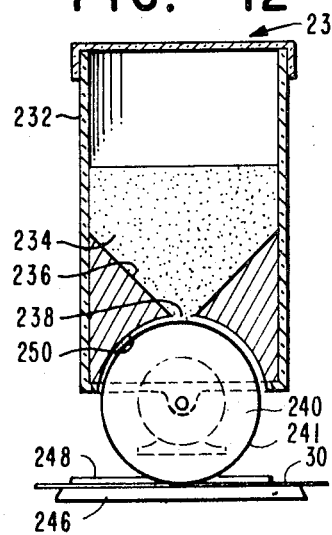
FIG. 12 shows a side elevation, cross-section view of a powdered lubricant dispensing apparatus; and, FIG. 13 shows a front elevation, cross-section view of the dispensing apparatus of FIG. 12.
Figure 13:
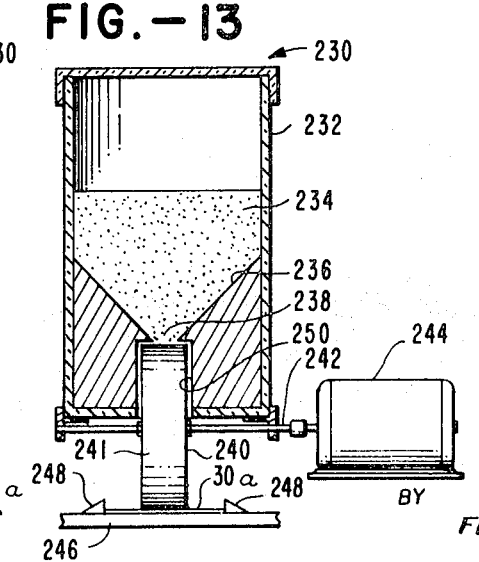

In accordance with another aspect of the present invention, shown in FIGS. 12 and 13, a lycopodium powder dispensing device 230 is provided. The dispenser 230 comprises a cylindrical container 232 for holding a supply 234 of lycopodium powder. The lower portion of the container 232 is provided with a funnel section 236 terminating at its lower end in an opening 238. Mounted below the funnel section 236 is a cylindrical dispensing wheel 240 having a smooth outer surface 241 in communication with the powder supply 234 via the opening 238. The wheel 240 is securely mounted on a shaft 242 which is driven by an electric motor 244 to rotate the wheel 240 in the direction of motion of the strip 30a. In operation of the dispensing device, the motor 244 is set to rotate the wheel 240 at a speed at which the proper amount of lubricating powder is picked up by the wheel periphery 241 for a given strip speed. A plate 246 having guides 248 mounted on the top surface thereof supports and guides the strip 30a past the outer periphery 241 of the wheel 240. The wheel 240 turns within a cavity 250 formed within the funnel section 236, the cavity being shaped to conform closely to the shape of the wheel. A relatively high tolerance, uniform clearance must be maintained between the wall of the cavity 250 and the outer surfaces of the wheel 240, approximately .002" having been found to provide satisfactory results.

The tube cutting means 60 forms no part of the present invention and can take any suitable form. In the example shown in FIG. 4, a cutting blade 260 is rotatably driven by a motor 262 secured to a movable base 264. The movable base 264 is mounted for simultaneous reciprocation in mutually orthogonal directions in timed relation with the velocity of the formed tube stock 92 being discharged from the mandrel 62. The base 264 is reciprocated (by means not shown) longitudinally, that is, in a direction parallel to the mandrel 62, along guide rods 266 mounted on a carriage 268. The carriage 268, in turn, is mounted for lateral reciprocation, that is, in a direction perpendicular to the mandrel axis, along guide rods 270 carried by a fixed base 272. Movement of the carriage 268 is provided by hydraulic cylinder/piston means 274 having a piston rod 276 extending therefrom and connected to the carriage 268. The cutting operation is performed when the carriage 268 is drawn laterally to move the cutting blade 260 across the path of the tube stock being discharged from the mandrel 62, while simultaneously being moved longitudinally at the velocity of the discharging tube stock so that a straight cut results. Other types of tube cutters, including gang cutters capable of severing a plurality of tube lengths simultaneously, will suggest themselves to those skilled in the art.

Although particular hygienic applicator devices and particular methods and apparatus have been described to illustrate various manners in which such devices can be fabricated and utilized in accordance with the present invention, it will be appreciated that the present invention is not limited to such particular illustrations and descriptions. Accordingly, any and all modifications, alterations and equivalent arrangements for such devices and the methods and apparatus for fabricating the same falling within the scope of the following claims should be considered to be part of the present invention.

What is claimed is:

1. Apparatus for fabricating tubes for hygienic media applicator means, comprising:
   a fixed mandrel;
   means operatively associated with the mandrel for helically winding a plurality of paper strips about the mandrel in overlapping, staggered relation, and for continuously discharging formed tube stock from the mandrel;
   means for supplying each strip to the winding means under substantially constant, low tension including:
      rotatable platform means for supporting a roll of the strip material;
      frictional drag means engaging a surface of the rotatable platform means;
      means connected to the frictional drag means for sensing strip tension and applying a corresponding force to the drag means, increasing strip tension tending to move the drag means away from the surface of the rotatable platform means to decrease the frictional force between the drag means and the rotatable platform means; and,
      biasing means connected to the frictional drag means tending to move the drag means toward the surface of the rotatable platform means in opposition to the strip tension sensing and applying means;
   means for applying liquid adhesive to both surfaces of an intermediate strip including:
      means mounted in the strip path defining a chamber including slit means, said strip material being adapted to be fed through the slit means and chamber;
      means connected to the chamber for supplying the adhesive thereto under pressure whereby the strip is wetted on all surfaces as it passes through the chamber; and,
      a pair of opposed, spaced doctor surfaces for removing excess adhesive from the surfaces of the strip and leaving uniform, equal thicknesses of adhesive on the strip surfaces, said strip material adapted to pass between the doctor surfaces after leaving the chamber; and,
   means for cutting predetermined lengths of the formed tube discharged from the mandrel.

2. Apparatus, as defined in claim 1, in which:
the mandrel has a reduced diameter portion extending from immediately adjacent the discharge side of the helical winding means to the end of the mandrel whereby drag forces between the formed tube and the mandrel are reduced substantially.

3. In a tube winding apparatus including a movable belt wrapped about a mandrel for drawing strip material from a supply roll and helically winding said strip material about said mandrel, means for supplying said strip material under substantially constant, low tension comprising:
   a base;
   a horizontal, circular turntable rotatably mounted on the base for receiving and securely engaging a supply roll of strip material;
   a horizontal arm pivotally mounted, at a point intermediate the ends of the arm, on the base;
   means secured to one end of the arm for frictionally engaging the outer periphery of the turntable and tending to brake the turntable during rotation;
   a vertically disposed roller, about which the strip material is adapted to be looped, rotatably mounted on the arm adjacent the other end thereof, whereby the tension of the strip material tends to move the frictional engaging means away from the turntable periphery; and,
   means connected to the other end of the arm for biasing said frictional engaging means into contact with the turntable periphery in opposition to the force applied to the arm by the strip material via the roller, whereby an increase in strip tension tends to move the frictional engaging means away from the turntable to decrease the braking force and a decrease in tension tends to move the frictional engaging means toward the turntable to increase the braking force, the turntable having a relatively high rotational inertia whereby the turntable tends to remain at a constant angular velocity despite high frequency variations in strip tension.

4. Apparatus, as defined in claim 3, in which:
said biasing means comprises a weight.

5. In a tube winding apparatus in which strip material is helically wound about a mandrel, means for applying liquid adhesive to said strip material including:
means defining a spout for receiving said adhesive and including slit means, said strip material being adapted to pass through said slit means and spout-defining means;

means connected to said spout-defining means for supplying said adhesive thereto under pressure whereby all surfaces of said strip are exposed to said adhesive, said adhesive-supplying means being oriented with respect to said slit means so that adhesive is directed against an edge of said strip material; and, a pair of opposed, spaced doctor surfaces for removing excess adhesive from the surfaces of said strip after leaving said spout-defining means and providing uniform, equal thicknesses of adhesive on the faces of the strip.

6. Apparatus, as defined in claim 5, in which:
the doctor surfaces are rounded, having a radius of at least one-eighth inch.

7. Apparatus, as defined in claim 5, in which:
the spout-defining means comprises a horizontally oriented tubular structure having one end closed, the adhesive supply means being connected to the other end, the slit means comprising a pair of central, horizontally oriented, opposed slits in the wall of the tubular structure.

8. Apparatus, as defined in claim 5, in which the adhesive supply means comprises:
reservoir means for containing a supply of adhesive and for receiving excess adhesive discharged from said spout-defining means and removed from the strip by the doctor surfaces;
conduit means including pump means interconnecting the reservoir means and the spout-defining means; and,
means operatively associated with the conduit means for heating the adhesive within said conduit means to a selected temperature.

9. In a tube winding apparatus of the type in which a movable belt, wrapped about a fixed mandrel, draws strip material from a supply roll and helically winds the strip material about the mandrel, means for dispensing metered amounts of a lubircating medium comprising lycopodium powder, onto the surface of the strip material engaging the fixed mandrel, including:
a vertically oriented container for holding a supply of lycopodium powder;

a body mounted in the lower portion of the interior of the container, the upper portion of the body defining a downwardly converging funnel-shaped cavity, the lower portion of the body defining a cavity having the shape of a cylindrical segment and communicating with the funnel-shaped cavity;

a cylindrical wheel mounted for rotation within the lower cavity, a uniform clearance of approximately .002 inch existing between the walls of the lower cavity and the outer peripheral surfaces of the portion of the cylindrical wheel within the lower cavity;

a motor connected to the cylinder for rotating the cylinder; and, means for guiding the strip material past the lower extremity of the curved surface of the cylinder.

10. Apparatus as defined in claim 1 in which at least one of said strips has a 180° twist between said liquid adhesive applying means and said mandrel.

11. Apparatus as defined in claim 5 wherein said strip material has a 180° twist between said doctor surfaces and the mandrel to prevent accumulation of adhesive on either of the faces of said strip material.

References Cited
UNITED STATES PATENTS

| | | | |
|---|---|---|---|
| 2,657,866 | 11/1953 | Lungstrom | 242—75.43 |
| 3,228,308 | 1/1966 | Denenberg | 156—190 |
| 2,623,703 | 12/1952 | Laycock | 242—75.43 |
| 3,298,353 | 1/1967 | Huffman | 118—401 |
| 3,242,828 | 3/1966 | Larkin | 93—77 R |
| 3,423,042 | 1/1969 | Lipfert | 242—75.43 |
| 2,398,034 | 4/1946 | Oganowski | 117—115 |
| 3,616,819 | 11/1971 | Dunlap et al. | 156—190 |
| 2,623,445 | 12/1952 | Robinson | 93—94 |
| 2,570,379 | 10/1951 | Robinson | 118—405 |
| 3,450,094 | 6/1969 | Bryan | 118—405 |

ALFRED L. LEAVITT, Primary Examiner

C. WESTON, Assistant Examiner

U.S. Cl. X.R.

118—401, 405, 413; 156—190, 192, 392; 242—75.43

UNITED STATES PATENT OFFICE
CERTIFICATE OF CORRECTION

Patent No. 3,764,438                     Dated October 9, 1973

Inventor(s) Joseph A. Voss and Carl W. Johnson

It is certified that error appears in the above-identified patent and that said Letters Patent are hereby corrected as shown below:

Column 2, line 12, change "matreial" to "material"; line 35, change "re-enfocred" to "re-enforced"; line 44, change "thhough" to "though". Column 5, line 23, change "a" to "the". Column 6, line 32, change "play" to "ply"; line 35, change "play" to "ply"; line 61, change "play" to "ply". Column 7, line 72, change "100" to "100%". Column 8, line 1, change "strengths" to "strength"; line 67, change "4" to "14". Column 9, line 21, change "horizotnal" to "horizontal". Column 11, line 2, after "about" insert --which--; line 13, change "This" to "The". Column 12, line 22, change "temperature" to "temperatures". Column 17, line 39, change "lubircating" to "lubricating".

Signed and sealed this 9th day of April 1974.

(SEAL)
Attest:

EDWARD M. FLETCHER, JR.
Attesting Officer

C. MARSHALL DANN
Commissioner of Patents